May 22, 1934. G. B. INGERSOLL 1,959,585
SIX WHEEL VEHICLE
Filed Dec. 8, 1930  3 Sheets-Sheet 2
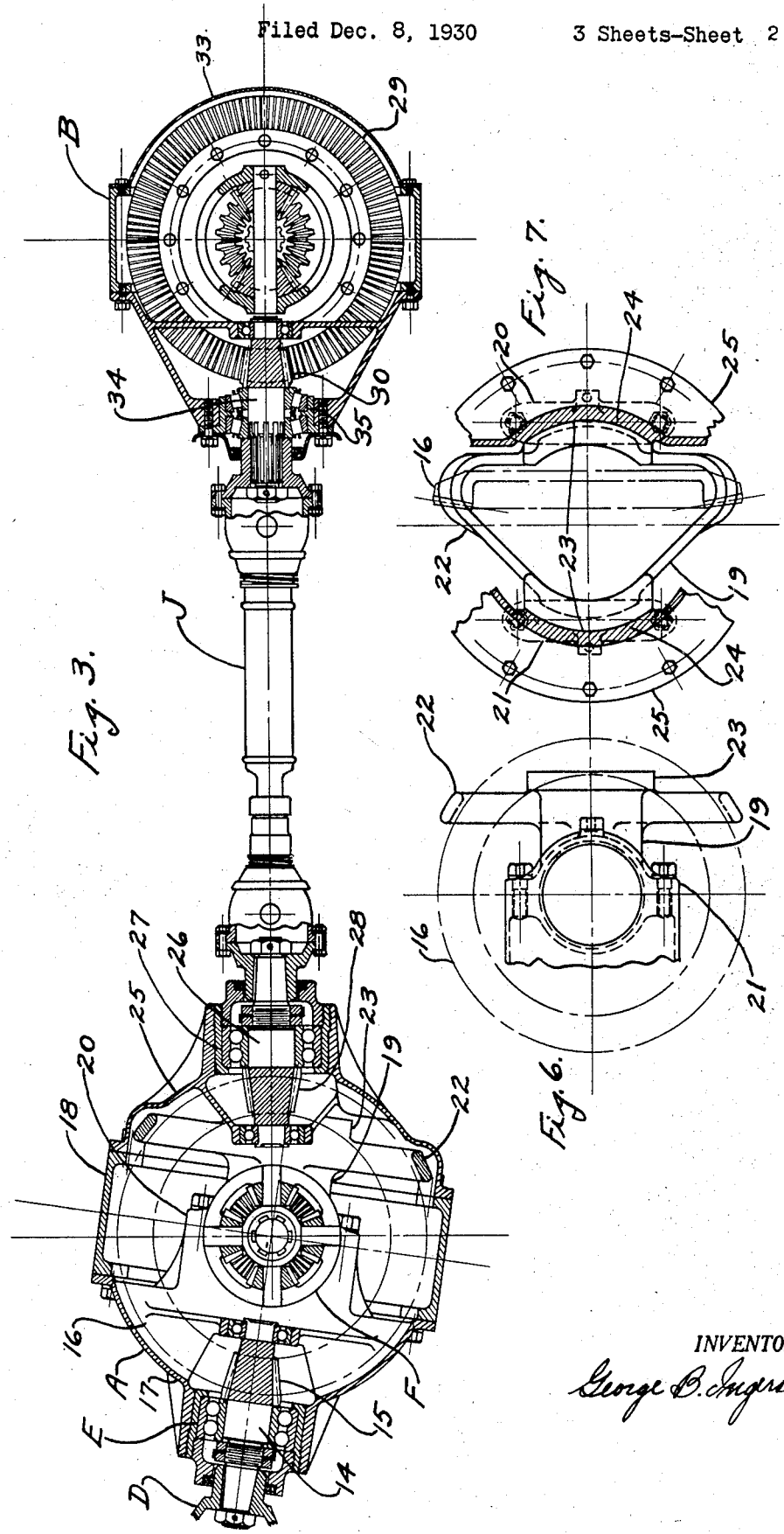
INVENTOR.
George B. Ingersoll

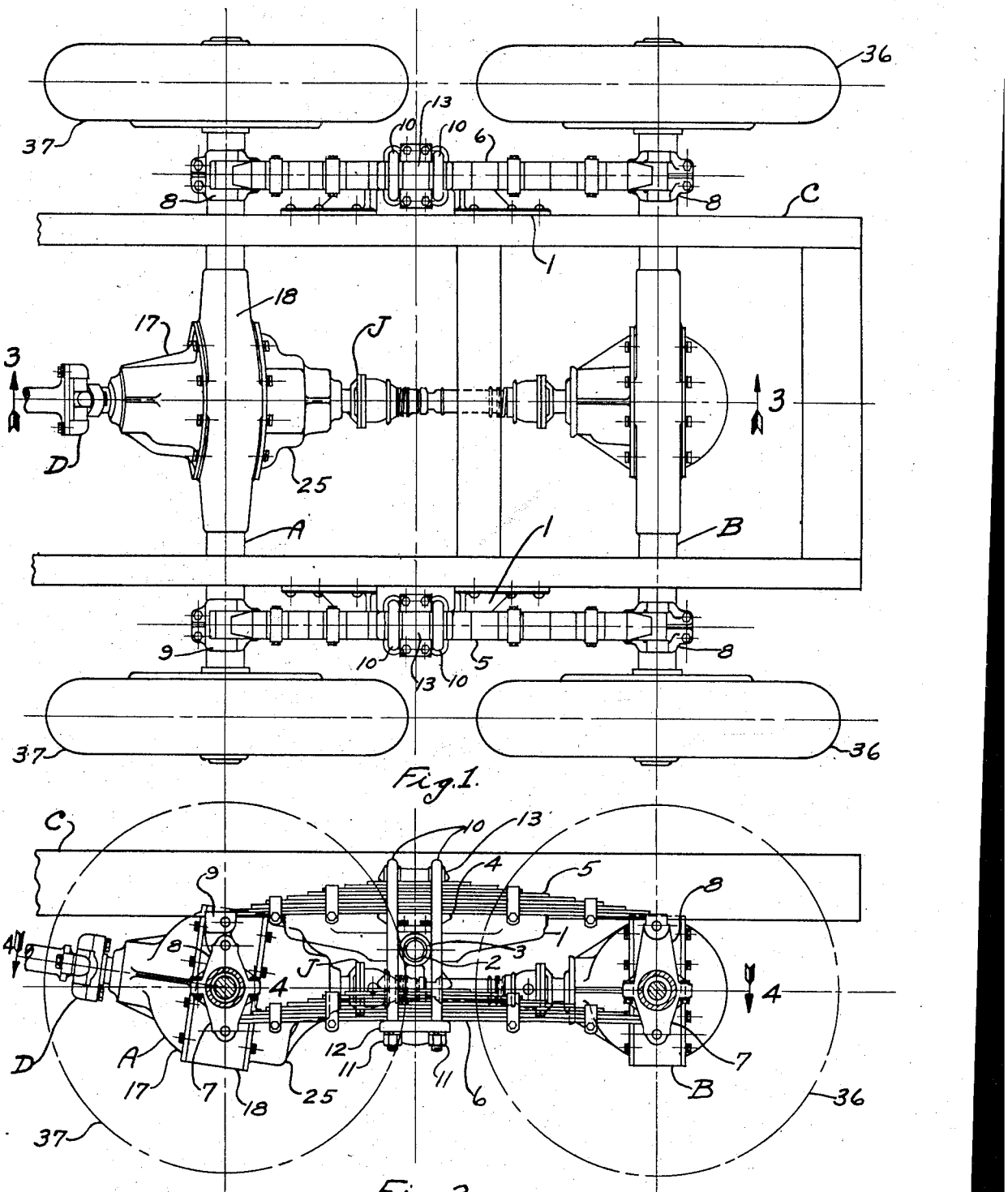

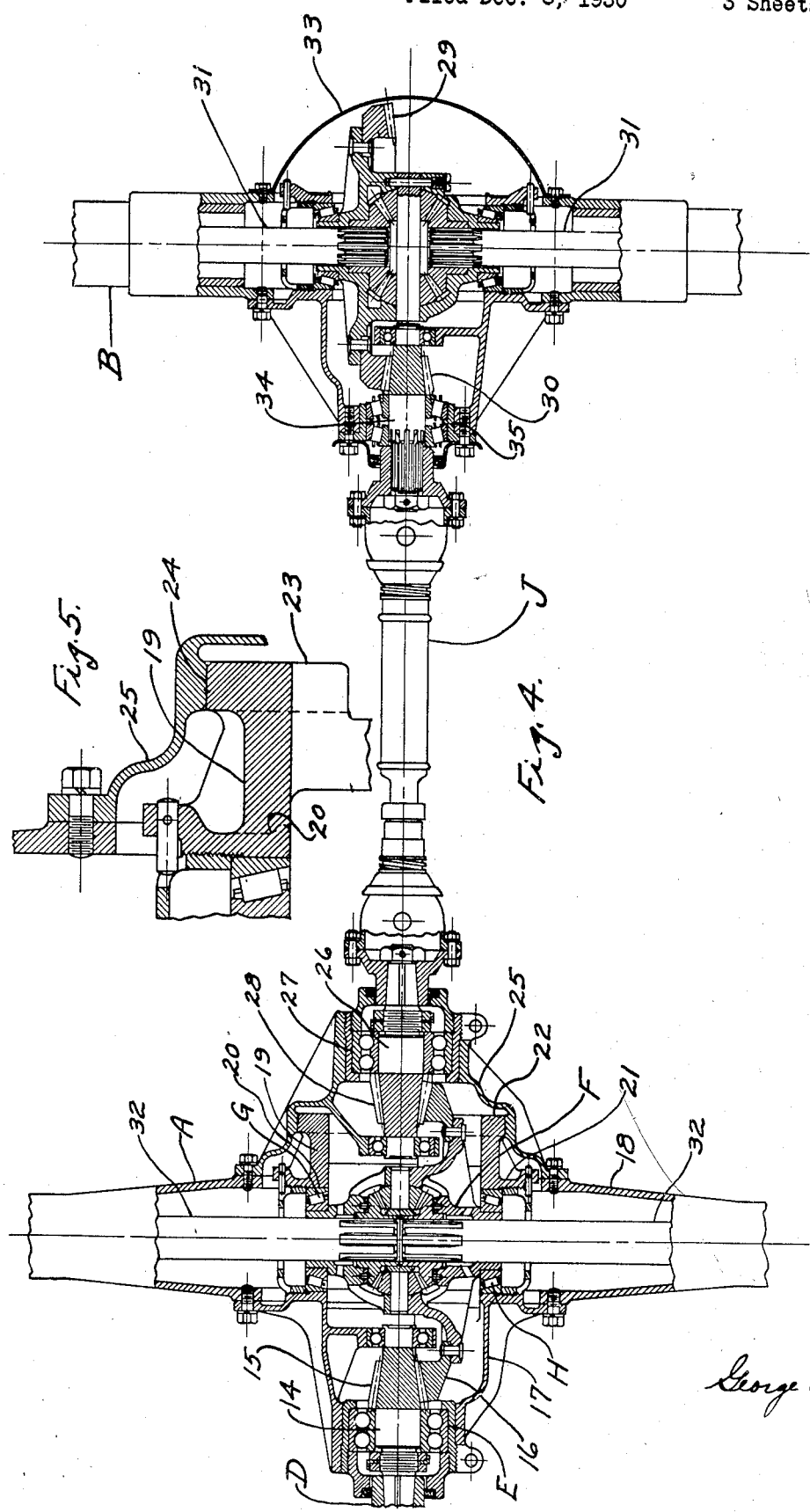

Patented May 22, 1934

1,959,585

UNITED STATES PATENT OFFICE 1,959,585

SIX WHEEL VEHICLE

George B. Ingersoll, Dearborn, Mich.

Application December 8, 1930, Serial No. 500,785

13 Claims. (Cl. 180—22)

My invention relates to improvements in six wheel vehicles in which the two bevel driving axles are used for propelling the vehicle. The objects of my improvement are, first, to provide a pair of bevel driving axles, one of which is capable of taking an additional driving load capacity; second, to provide a pair of bevel driving axles, one of which is driven by a pinion engaging the driving ring gear of the other of the bevel driving axles; third, to provide a bevel driving axle having a driven ring gear for driving a second driven gear therefrom; fourth, to provide a bevel driving axle incorporating a driving and driven bevel pinion from a common ring gear, both of said bevel pinions being identical; fifth, to provide a bevel driving axle with a rear cover housing supporting a driven bevel pinion, said cover housing being positively aligned with the supporting structure of the main bevel ring gear of the axle; sixth, to provide a bevel driving axle having a differential assembly incorporating a pair of integral bearing caps together with a pilot portion therein; and, seventh, to provide a bevel driving axle having a ring used as a member for driving a ring gear member in a second axle, the ring gear member in the said axle being oppositely disposed from the ring gear of the first bevel axle.

I attain these objects by the mechanism illustrated in the accompanying drawings, in which—

Figure 1 is a plan view of the rear portion of the six wheel vehicle disclosing two driving rear axles; Fig. 2, a side elevation of the rear portion of the six wheel vehicle disclosing two driving rear axles; Fig. 3, a sectional view of the two driving axles taken on the line 3—3, Fig. 1; Fig. 4, a sectional view of the driving mechanism of the two driving axles taken on the line 4—4, Fig. 2; Fig. 5, a partial sectional view of the rear cover housing of the forward driving axle taken on the line 4—4, Fig. 2; Fig. 6, a side elevation of the differential bearing cap member of the front driving axle showing the relation of the ring gear relative thereto; and Fig. 7, an end elevation of the differential bearing cap member of the front driving axle showing the relation of the ring gear relative thereto, together with a section of the piloted portion of the rear housing cover over the pilot extension portion of the differential bearing cap member.

Similar numerals refer to similar parts throughout the several views.

The front driving axle A and the rear driving axle B of a six wheel driving vehicle are disclosed in Figures 1 and 2 as being attached to the frame assembly C by means hereinafter explained, the front axle and front end of the vehicle not being disclosed. The trunnion brackets 1 are suitably fastened to the frame assembly C at each of its sides and support a trunnion pin 2 on which oscillate the spring seats 3 and 4, which are suitably fastened together and on which are seated the upper springs 5 and the lower springs 6. Around the housing of the axle assemblies A and B are suitably fastened the lower brackets 7 and the upper brackets 8. The ends of the lower springs 6 are pivotally connected with the lower brackets 7. The upper springs 5 are fastened at each of their ends to one of the upper spring brackets 8 and to a spring shackle 9, the spring shackle 9 being pivotally connected to one of the upper spring brackets 8 as shown on the forward driving axle in Fig. 2. It is to be understood that the upper spring bracket 8, which is fastened to the front driving axle A as disclosed in Fig. 2, will be attached to the rear driving axle on the opposite side of the frame assembly C in order to provide a shackle 9 at one corner only of each of the driving axles. This construction is similar to that disclosed in the United States Patent Serial Number 1,641,333 issued to the applicant on September 6, 1927. Springs 5 and 6 are held on the spring seats 3 and 4, respectively, by the spring clips 10, nuts 11, the lower spring clip seat 12 and upper spring clip spacer 13.

The front driving propeller shaft assembly D is suitably connected with the motor clutch and transmission of the six wheel driving vehicle, these parts not being disclosed. The front driving propeller shaft D is suitably connected to the front driving pinion shaft 14, to which is integrally attached the driving pinion gear 15, which meshes with and drives the ring gear 16. The front driving pinion shaft 14 is suitably mounted on the bearing and cage assembly E, which is suitably mounted in the front differential carrier housing 17, the front differential carrier housing 17 being suitably fastened to the banjo portion 18 of the axle housing. The differential carrier and housing assembly F is of the usual construction and is assembled integrally with the ring gear 16 and is suitably mounted at each of its sides in the differential bearing assemblies G and H, which are supported in the differential carrier housing 17. Instead of separate bearing cap members retaining differential bearing assemblies G and H in their positions, an integral bearing cap member 19, as more fully shown in Figs. 6 and 7, is used, the bearing cap member 19 having the bearing caps 20 and 21 integrally attached thereto. The bearing cap member 19 is further provided with a connecting portion 22, to which are further attached portions 23, which are machined with cylindrical surfaces to fit within the cylindrically machined surfaces 24 of the rear cover housing member 25 of the front driving axle assembly A. The rear cover housing member 25 is attached to the banjo portion 18 of the axle housing in the same manner in which the differential carrier housing 17 is attached, the rear cover housing member 25 replacing the usual plain cover member which is ordinarily used on the rear of the bevel axle assemblies and is used as indicated at 33 on the rear of the rear driving axle assembly B. The rear cover housing member 25 supports the driven shaft 26, which is identical with the driven shaft 14 at the front of the driving axle assembly A. The driven shaft 26 is supported in a bearing cage assembly 27, which is identical with that used at the front of the driving axle assembly A. To the driven shaft member 26 is integrally connected the driven pinion gear 28, which engages the ring gear 16 and is driven thereby. One of the important essentials for the successful operation of a construction of this kind is to properly align the rear cover housing member 25 in the banjo portion 18 so that proper mesh of the gears 28 and 16 may be obtained. The gears 15, 16 and 28 are of the spiral bevel type and there is a tendency in the normal operation of the drive gear 15 to work away from the ring gear 16, due to the thrust load on the gear 15. When the identical gear 15 is used at the rear of the front driving housing as indicated at 28, the thrust load generated by the engagement of the ring gear 16 and the pinion gear 28 will tend to draw the driven pinion gear 28 towards the ring gear 16. It is therefore absolutely necessary that the gear 28 be rigidly supported in exact engaging alignment with the ring gear 16. This rigid and accurate engaging alignment is obtained by the integral construction of the differential bearing caps 20 and 21 as above described, the bearing caps 20 and 21 being held in alignment with the driven pinion shaft 28 by the piloted portion of the rear housing member 25 fitting over the machined pilot surfaces of the differential bearing cap member 19. It is also to be noted that the front propeller shaft assembly D is assembled at an angle relative to the horizontal centerline of the driving axle assemblies A and B to give the proper inclination to the propeller shaft assembly D, which connects with the motor not shown on the six wheel vehicle. This necessitates the rear housing member 25 having its bearing cage extension portion set at an angle with its front face, which assembles with the banjo portion 18. The rear driving axle assembly B is of the similar type to that of the front driving axle assembly A, excepting that, as denoted by the drawings, the entire construction of the front driving axle member A is considerably larger than the parts used in the rear driving axle B. It has been found that there is a considerable transference of thrust load on the pinion shafts due to the engagement of the ring gear 16 with the pinion gears 15 and 28 at various times of operation and that in some instances the full power of the motor and transmission units momentarily taken by the front driving axle assembly A. Therefore, it is necessary to have stronger and larger units in the front driving axle assembly A to successfully meet all conditions of service.

It is further to be especially noted that the ring gear 29 which is practically the same as the ring gear 16 of the front driving axle assembly A is located on the opposite side of the vertical centerline of the pinion gear 30, which engages and drives the ring gear 29, from that of the ring gear 16. This is absolutely necessary so that the drive shafts 31 of the rear driving axle assembly B together with the wheels 36 will revolve in the same direction as the drive shafts 32 of the front driving axle assembly A together with the wheels 37. The pinion gear 30 is integrally connected with the pinion shaft 34 and is supported in the bearing cage assembly 35 in a similar manner to the pinion gear construction of the front driving axle assembly A.

The propeller shaft assembly J is connected to the pinion shaft 26 at the rear of the front driving axle assembly A and to the pinion shaft 34 at the front of the driving axle assembly B, thus transmitting power from the front to the rear driving axle assembly. It is thus to be noted that a much more economical design of dual driving axle assemblies can be utilized than the usual type of dual bevel driven axle assemblies in six wheel vehicles, which utilize a secondary set of gears to provide for the driving of the rear axle assembly from the front axle assembly.

I claim:

1. In a six wheel vehicle, the combination of a driving axle comprising a differential ring gear assembly equipped with a driving pinion gear therefor together with an aligning portion thereon, said driving pinion gear engaging the differential ring gear assembly, a rear pinion gear assembly suitably mounted on said driving axle, the pinion gear of said rear pinion gear assembly engaging with and being driven by the differential ring gear of said differential ring gear assembly, said rear pinion gear assembly being provided with an aligning portion engaging the aligning portion of said first mentioned differential ring gear assembly, a second driving axle comprising a differential ring gear equipped with a driving pinion gear therefor, the differential ring gear of said second driving axle being oppositely disposed to the differential ring gear of said first mentioned driving axle relative to the driving pinion gears of said first and said second mentioned driving axles, propeller shaft means connecting the pinion gear of said rear pinion gear assembly with the driving pinion gear of said second driving axle, and means for absorbing the torque reactions of said first mentioned and said second mentioned driving axles.

2. In a six wheel vehicle comprising an axle housing member, the combination of a differential gear assembly comprising a ring gear, a pair of pinion gears engaging the ring gear of said differential gear assembly, and a pair of housing members, each of said pair of housing members supporting one of said pair of pinion gears independently of said differential gear assembly, said pair of housing members engaging each other to provide for the alignment of each of said pair of pinion gears with the ring gear of said differential gear assembly, the engaging portions of said pair of housing members being located between said pair of housing members.

3. In a six wheel vehicle, the combination of an axle housing having oppositely disposed openings, a differential gear assembly suitably mounted in said axle housing, said differential gear comprising a single ring gear, cover members mounted on said axle housing, said cover members being oppositely disposed, a pinion gear mounted in each of said cover members, each of said pinion gears engaging the single ring gear of said differential gear assembly, and means extending between said cover members, said means tending to hold said cover members in alignment, said means being suitably attached to said cover members.

4. In a six wheel vehicle, the combination of a driving axle equipped with a differential ring gear assembly, a driving pinion removably mounted in said differential ring gear assembly, said driving pinion engaging the ring gear of said differential ring gear assembly, a second pinion gear engaging the ring gear of said differential ring gear assembly, removably mounted means supporting said second pinion gear, means for aligning said second pinion gear with the ring gear of said differential gear assembly, a second driving axle equipped with a differential ring gear assembly, a third driving pinion removably mounted in the differential ring gear assembly of said second driving axle, said third driving pinion engaging the ring gear of the differential assembly of said second driving axle, propeller shaft means connecting said second and said third mentioned driving pinions, and means for absorbing the torque reactions of said first mentioned and said second mentioned driving axles.

5. In a six wheel vehicle, the combination of a pair of driving axles each equipped with a differential ring gear assembly, a pair of removably mounted pinion gears engaging the ring gear of the differential gear assembly of one of the driving axles, removable means supporting one of said pair of removably mounted pinion gears, means for aligning said removable means with one of the differential ring gear assembles of the pair of driving axles, a removably mounted pinion gear engaging the ring gear of the differential ring gear assembly of the other of said driving axles, propeller shaft means connecting one of said first mentioned pair of removably mounted pinion gears with said last mentioned removably mounted pinion gear, and means for absorbing the torque reactions of said pair of driving axles.

6. In a six wheel vehicle, the combination of a pair of driving axles each comprising a differential ring gear assembly, a pair of removably mounted pinion gears engaging the differential ring gear of one of said pair of driving axles, a removably mounted member for supporting one of said pair of removably mounted pinion gears, said removably mounted member being provided with portions for engaging portions of the differential ring gear assembly of said one of said pair of driving axles, a removably mounted pinion gear engaging the differential ring gear of the other of said pair of driving axles, a removably mounted member for supporting said last mentioned pinion gear, propeller shaft means between two of said removably mounted pinion gears, and torque absorbing means connected with said pair of driving axles.

7. In a six wheel vehicle, the combination of an axle housing member, a differential gear assembly mounted in said axle housing member, said differential gear assembly being provided with bearing portions, a pinion gear engaging said differential gear assembly, a housing member suitably mounted on said axle housing member, said last mentioned housing member supporting said pinion gear, said last mentioned housing member being further provided with an alignment bearing portion located between said pinion gear and said differential gear assembly, bearing members in said last mentioned housing, one of said bearing members being located between said differential gear assembly and said pinion gear, and a bearing cap member engaging the bearing portions of said differential gear assembly, said bearing cap member being provided with an alignment bearing portion engaging the alignment bearing portion of said second mentioned housing member.

8. In a driving axle comprising a housing, the combination of a differential ring gear assembly provided with an aligning portion, said differential ring gear assembly being mounted in the housing of the driving axle, a pinion gear engaging the ring gear of said differential ring gear assembly, a housing supporting said pinion gear, said housing being disconnected from said differential ring gear assembly, and a cover housing supporting said housing supporting said pinion gear, said cover housing being provided with an aligning portion engaging the aligning portion of said differential ring gear assembly.

9. In a six wheel vehicle, the combination of an axle housing provided with a pair of oppositely disposed openings, a differential gear assembly comprising a differential ring gear, said differential ring gear assembly being provided with means for attachment to said axle housing, said differential gear assembly extending through one of the openings of said axle housing, a driving gear suitably mounted in said differential gear assembly, said driving gear engaging the ring gear of said differential gear assembly, a driven gear engaging the ring gear of said differential ring gear assembly, a housing member supporting said driven gear, and a cover housing supporting said last mentioned housing member, said cover housing separating said last mentioned housing member from engagement with said differential gear assembly, said cover housing being provided with means for attachment to said axle housing.

10. In a six wheel vehicle, the combination of an axle housing, a differential gear assembly suitably mounted in said axle housing, said differential gear assembly comprising a ring gear, a pinion gear engaging the ring gear of said differential gear assembly, a housing member supporting said pinion gear, and a second housing member supporting said first mentioned housing member, said second housing member separating said first mentioned housing from engagement with said differential gear assembly, said second housing member being suitably supported on said axle housing.

11. In a six wheel vehicle, the combination of an axle housing provided with an opening, a differential ring gear assembly suitably supported in said axle housing, said differential ring gear assembly being provided with an alignment bearing portion, a gear member engaging the ring gear of said differential ring gear assembly, a housing member supporting said gear member, said housing member being removed from engagement with said differential ring gear assembly, and a cover housing member supporting said last mentioned housing member, said cover housing member being provided with an alignment bearing portion engaging the alignment bearing portion of said differential ring gear assembly, said cover housing member being suitably attached to said axle housing.

12. In a six wheel vehicle, the combination of an axle housing, a differential gear assembly suitably mounted in said axle housing, said differential gear assembly being provided with a ring gear together with bearing cap members provided with an aligning bearing portion, a gear member engaging the ring gear of differential gear assembly, a housing member supporting said gear member, said housing member being provided with an outer cylindrical bearing surface, and a second housing member provided with a cylindrical bore engaging the outer cylindrical bearing surface of said first mentioned housing member, said second housing member being further provided with an aligning bearing portion engaging the aligning bearing portion of the bearing cap members of said differential gear assembly, said second housing member being supported on said axle housing.

13. In a six wheel vehicle, the combination of an axle housing, a differential gear assembly comprising a ring gear together with a bearing cap member having a cylindrical bearing surface, a pinion gear engaging the ring gear of said differential gear assembly, a housing member supporting said pinion gear, said housing member having an outer cylindrical surface located concentrically with the cylindrical bearing surface of the bearing cap member of said differential gear assembly, and a second housing member supporting said first mentioned housing member, said second housing member being provided with a cylindrical bearing surface engaging the outer cylindrical surface of said first mentioned housing member, said second housing member being further provided with a cylindrical surface engaging the cylindrical bearing surface of the bearing cap member of said differential gear assembly, said second housing member being suitably supported on said axle housing.

GEORGE B. INGERSOLL.